United States Patent
Younes

(10) Patent No.: US 6,395,798 B1
(45) Date of Patent: May 28, 2002

(54) LOW DENSITY MICROCELLULAR ELASTOMERS BASED ON ISOCYANATE-TERMINATED PREPOLYMERS

(75) Inventor: Usama E. Younes, West Chester, PA (US)

(73) Assignee: Bayer Antwerp, N.V., Antwerpen (BE)

( * ) Notice: Subject to any disclaimer, the term of this patent is extended or adjusted under 35 U.S.C. 154(b) by 1013 days.

(21) Appl. No.: 08/575,976

(22) Filed: Dec. 21, 1995

(51) Int. Cl.[7] .......................... C08J 9/04; C08G 18/10; C08G 18/48; C08L 75/08
(52) U.S. Cl. ................. 521/159; 521/137; 521/174; 521/176; 525/127; 525/131; 525/453; 525/460; 528/65; 528/76
(58) Field of Search ................. 521/159, 174, 521/176, 137; 528/65, 76; 525/127, 131, 453, 460

(56) References Cited

U.S. PATENT DOCUMENTS

| | | | |
|---|---|---|---|
| 4,239,879 A | 12/1980 | Fabris et al. | 528/76 |
| 4,559,366 A | * 12/1985 | Hostettler | 521/51 |
| 4,985,491 A | 1/1991 | Reisch | 524/875 |
| 5,100,997 A | 3/1992 | Reisch et al. | 528/60 |
| 5,106,874 A | 4/1992 | Porter et al. | 528/64 |
| 5,116,931 A | 5/1992 | Reisch et al. | 528/59 |
| 5,124,425 A | 6/1992 | Higuchi et al. | 528/59 |
| 5,136,010 A | 8/1992 | Reisch et al. | 528/75 |
| 5,158,922 A | 10/1992 | Hinney et al. | 502/175 |
| 5,250,582 A | 10/1993 | Hire et al. | 521/157 |
| 5,382,646 A | * 1/1995 | Narayan et al. | 528/60 |

FOREIGN PATENT DOCUMENTS

JP 47202 2/1991

OTHER PUBLICATIONS

"Urethane Applications for Novel High Molecular Weight Polyols", R.L. Mascioli, 32nd Annual Polyurethane Technical/Marketing Conference, Oct. 1–4, 1989, pp. 139–142.
"Standard Methods of Testing Urethane Foam Polyol Raw Materials" ASTM Designation No.: D 2849–69.
"Thermoplastic Polyurethane Elastomers Made from High Moleculer Weight Poly–L Polyols", C.P. Smith, et al, Polyurethanes World Congress 1991–Sep. 24–26, 1991, pp. 313–318.
"Polyurethane Sealants and Cast Elastomers with Superior Physical Properties", J.W. Reisch, et al, 33rd Annual Polyurethane Technical Marketing Conference, Sep.30–Oct. 3, 1990, pp. 368–374.

* cited by examiner

Primary Examiner—Rabon Sergent
(74) Attorney, Agent, or Firm—Joseph C. Gil; Lyndanne M. Whalen

(57) ABSTRACT

Low density microcellular polyurethane foams suitable for athletic shoe midsoles and other applications are prepared by diol chain extension of 12 to 16% free NCO isocyanate-terminated prepolymers prepared by reacting an excess of di- or polyisocyanate with one or more high molecular weight, high functionality polyoxypropylene diols preferably employing water as a reactive blowing agent. The microcellular elastomers exhibit increased hardness despite the higher molecular weight of the polyoxypropylene diol and further exhibit greater tear resistance, lower compression set, and markedly lower shrinkage.

20 Claims, No Drawings

LOW DENSITY MICROCELLULAR ELASTOMERS BASED ON ISOCYANATE-TERMINATED PREPOLYMERS

TECHNICAL FIELD

The present invention pertains to the field of microcellular polyurethane elastomers. More particularly, the present invention pertains to microcellular elastomers suitable for athletic midsoles prepared by the diol chain extension of an isocyanate-terminated prepolymer having an NCO group content in the range of 6–16 weight percent, prepared from a high functionality, high molecular weight polyoxyalkylene diol in the presence of water as a reactive blowing agent.

BACKGROUND ART

Microcellular polyurethane elastomers have become increasingly important in the athletic shoe and other markets. The midsoles of athletic shoes in particular require high resiliency and low compression set while maintaining suitable hardness. The density of the microcellular midsoles is also important, as shoes of light weight are generally desired. The method currently used by the industry to prepare microcellular midsoles and other products of similar density is to chain extend an 18% NCO content, isocyanate-terminated prepolymer with an aliphatic diol. The Shore A hardness may be adjusted within the range of Shore A 30 to Shore A 50 by varying the type and amount of chain extenders and cross-linkers.

The prior art products have several defects which can be improved upon, however. For example, midsoles and other microcellular components are normally molded to a density of from 0.35 to 0.50 g/cm$^3$ to overcome problems with respect to shrinkage. If the microcellular foam product shrinks appreciably following demold, it will not possess the desired design dimensions. As a result, the mold must be designed, largely by trial and error, to produce a dimensionally larger part which, upon shrinking, has the desired final dimensions. It would be advantageous to produce microcellular elastomers of lower density without undue shrinkage. The microcellular foam product must also possess the necessary tensile strength, elongation, and tear strength necessary to maintain integrity not only during use, but in manufacturing processes including demolding and insertion into fabric surrounds, etc. Finally, the compression set must be low, otherwise a great deal of the cushioning will be lost after the first few periods of use.

Of the raw material components used in the preparation of microcellular elastomers, the isocyanate component of the isocyanate-terminated prepolymer is generally the most expensive. However, lowering the % NCO content of the isocyanate-terminated prepolymers used to prepare the elastomers has not been successful heretofore, as lower NCO content prepolymers produced a softer elastomer which does not provide sufficient support. Thus, the industry standard for microcellular elastomer isocyanate-terminated prepolymers has remained at 18% NCO.

The use of higher molecular weight polyoxyalkylene polyols during the preparation of the isocyanate-terminated prepolymers would allow the preparation of lower NCO content prepolymers and the use of less isocyanate relative to polyol weight. However, until recently, higher molecular weight polyols of suitable functionality have not been available. Moreover, the use of a higher molecular weight polyol should increase the soft segment content of the elastomer, which would be expected to produce an elastomer of insufficient hardness.

Polyoxypropylene diols used in prepolymer preparation have been limited to molecular weights of c.a. 2000 Da (Daltons) or less due to the rearrangement of propylene oxide to allyl alcohol during base-catalyzed oxypropylation, and the subsequent oxypropylation of this monohydric species. As a result of this phenomenon, during continued oxyalkylation, the mol percentage of monomeric oligomers steadily increases until the gain in average molecular ceases to increase further. At this point, the monofunctional oligomers may comprise 50 mol percent of the product, and the theoretical, or "nominal" functionality of two will be lowered to c.a. 1.6 to 1.7 or less. Thus, the preparation of high molecular weight polyoxypropylene diols having actual functionalities close to two has been impossible.

Numerous attempts have been made to lower the monol content of polyoxyalkylene polyols, but few have been successful. Use of more expensive and less commonly used basic catalysts such as cesium or rubidium hydroxides, and barium or strontium oxides or hydroxides have resulted in some improvement, as has lowering catalyst level and oxyalkylation temperatures, the latter two measures at the expense of greatly increased process time. Moreover, the improvement, as measured by the amount of unsaturation by ASTM D-2849-69, "Testing Urethane Foam Polyol Raw Materials," has been marginal at best.

Use of metal naphthenates, alone or in conjunction with tertiary amine co-catalysts, has resulted in lowering the unsaturation from the normal range of 0.06–0.12 meq/g to about 0.03–0.04 meq/g. However, at the latter level, a 4000 Da polyoxypropylene diol still contains c.a. 15% monol, and has an actual average functionality of only about 1.85.

The use of double metal cyanide complex catalysts as oxyalkylation catalysts was proposed in the decade of the 1960's and improved catalysts, such as those disclosed in U.S. Pat. No. 5,158,922 have lowered unsaturation to the range of 0.015 to 0.018 meq/g. However, the polyol products still contain from 5 to 10% monol, and commercialization has been problematic due to the cost/activity ratio of the catalyst as well as the difficulty of removing catalyst residues from the polyol product. Most recently, the ARCO Chemical Company has introduced double metal cyanide complex catalysts of much higher activity. In addition, these catalysts allow easy removal of catalyst residues from the polyol product by simple filtration. As a result, polyoxyalkylene polyols of exceptionally low unsaturation, in the range of 0.003 to 0.007 meq/g have now been commercialized. Although the exceptionally low but measurable unsaturation implies a finite monol concentration, conventional gel permeation chromatography fails to detect a low molecular weight component which would correspond to monofunctional species. The content of monol is believed to be less than 2 mol percent. Moreover, the product polyols have very low polydispersities, generally in the range of Mw/Mn= 1.10, thus being virtually "monodisperse".

Despite long standing efforts to lower unsaturation in polyoxyalkylene polyols, exceptionally low unsaturation polyols are not generally "drop in" replacements for conventional, base-catalyzed polyols. For example, R. L. Mascioli, "Urethane Applications For Novel High Molecular Weight Polyols", 32nd Annual Polyurethane Technical/Marketing Conference, Oct. 1–4, 1989, disclosed that substitution of a 11,000 Da molecular weight triol having an unsaturation of about 0.007 meq/g for a conventional, base-catalyzed triol having a calculated molecular weight of c.a. 6000 and an unsaturation of 0.084 meq/g, resulted in a stiff and boardy foam product, whereas a softer product would be expected in view of the higher polyol molecular weight.

C. P. Smith et al., "Thermoplastic Polyurethane Elastomers Made From High Molecular Weight Poly-L™ Polyols", Polyurethanes World Congress—Sep. 24–26, pp. 313–318, disclosed one-shot polyurethane elastomers prepared from high molecular weight, high primary hydroxyl, polyoxyethylene-capped diols having measured unsaturations in the range of 0.012 to 0.016 meq/g. As expected, cast elastomers prepared from a 6600 Da molecular weight diol were softer than those prepared from a 4000 Da diol, and of similar hardness to those prepared from a conventional base-catalyzed diol, although having improved elongation and tensile strength.

In U.S. Pat. No. 4,985,491 are disclosed moisture cured polyurethane sealants containing very low NCO group content prepolymers prepared from high molecular weight triols. Sealants prepared from high molecular weight polyoxyethylene capped (10,000 Da) triols had significantly lower hardness than those prepared from 5800 Da triols. Both triols had unsaturations in the range of 0.018 to 0.022 meq/g, and monol content ranging from 5 to 19 mol percent. In U.S. Pat. No. 5,136,010 are disclosed butanediol extended cast elastomers prepared from 9% NCO isocyanate-terminated prepolymers. Elastomers prepared from higher molecular weight, low monol content diols had similar hardness to those prepared both from lower molecular weight, low monol diols as well as conventionally, base-catalyzed, high monol content diols.

It would be advantageous to be able to provide a method of preparing low density microcellular elastomers having suitable hardness while employing isocyanate-terminated prepolymers having less NCO group content than the 18% NCO industry standard. It would be further desirable to provide a method of preparing low density microcellular elastomers having improved compression set, tear strength, and resiliency. It would be yet further desirable to provide microcellular elastomers which offer little or no shrinkage upon demold.

SUMMARY OF THE INVENTION

It has now been unexpectedly discovered that polyurethane water-blown microcellular elastomers with improved properties may be prepared by the diol chain extension of an isocyanate-terminated prepolymer having a free NCO group content of between 6 weight percent and about 16 weight percent, when the prepolymer is prepared by reacting a polyoxypropylene diol having a molecular weight of from about 3000 Da to about 10,000 Da and an actual functionality greater than about 1.95, with a stoichiometric excess of a di- or polyisocyanate. The microcellular elastomers are suitable for applications such as athletic shoe midsoles, tires, athletic seating, and other applications, and most surprisingly exhibit little shrinkage.

DESCRIPTION OF THE PREFERRED EMBODIMENTS

The low density microcellular elastomers of the subject invention have densities in the range of 0.15 g/cm$^3$ to about 0.6 g/cm$^3$, and are prepared by a prepolymer process involving the reaction of an isocyanate component (A-side) with a polyol component (B-side). The isocyanate component comprises in substantial part an isocyanate-terminated prepolymer having an NCO group content of from 6 to about 16 weight percent, prepared by reacting a stoichiometric excess of one or more di- or polyisocyanates with one or more polyoxypropylene diols having a molecular weight of 3000 Da to 10,000 Da and a functionality greater or equal to 1.95.

All molecular weights and equivalent weights herein are number average molecular and equivalent weights expressed in Da (Daltons). The polyol component comprises in substantial part one or more diol chain extenders, and optionally one or more polymer polyols or polymer-modified polyols, hereinafter termed polyol polymer dispersions. The isocyanate component and polyol component are reacted at an isocyanate index of from 70 to 130, preferably 90 to 110, and most preferably 95 to 105.

The isocyanate component is a critical aspect of the subject invention. The isocyanate component comprises in substantial part, one or more isocyanate-terminated prepolymers having an NCO group content of from 6 to about 16 weight percent, preferably 8 to about 16 weight percent, prepared by reacting a stoichiometric excess of one or more di- or polyisocyanates with one or more polyoxypropylene diols having an average molecular weight of between 3000 Da and 10,000 Da and an actual functionality of about 1.95 or more, optionally with high molecular weight, high functionality, triols, tetrols, or the like, as described hereinafter. By the term "in substantial part" as this term relates to the isocyanate component, is meant that greater than 70 mol percent comprises such a prepolymer. Preferably, the isocyanate-terminated prepolymers just described constitute in excess of 80 mol percent of the isocyanate component, and more preferably greater than 90 mol percent.

The isocyanate-terminated prepolymers based on high molecular weight, high functionality polyoxypropylene diols are prepared by conventional prepolymer processing techniques, e.g. by reacting a stoichiometric excess of isocyanate with the diol component neat at slightly elevated temperature under an inert gas or nitrogen pad, or with the aid of a suitable quantity of a urethane reaction-promoting catalyst. Standard methods of preparation may be found in J. H. Saunders and K. C. Frisch, Polyurethanes: Chemistry And Technology, Interscience Publishers, 1963; and the Polyurethane Handbook, Gunter Oertel, Ed., Hanser Publications, © 1985.

The isocyanate used to prepare the isocyanate-terminated prepolymers may be any di- or polyisocyanate, including but not limited to aliphatic and cycloaliphatic diisocyanates such as 1,6-hexamethylene diisocyanate, isophorone diisocyanate, 2,4- and 2,6-methylcyclohexane diisocyanate and mixtures thereof, and 2,2'-, 2,4'-, and 4,4'-diisocyanatocyclohexylmethane; aromatic isocyanates such as 2,4- and 2,6-toluene diisocyanates and particularly their commercial mixtures such as 80/20 and 65/35 isomer blends, 2,2'-, 2,4'-, and 4,4'-diphenylmethane diisocyanate and mixtures thereof, and polyphenylene polymethylene polyisocyanates. Particularly preferred isocyanates include the toluene diisocyanates and diphenylmethane diisocyanates, particularly mixtures containing predominately 4,4'-diphenylmethane diisocyanate (4,4'-MDI).

Modified isocyanates are also useful. Modified isocyanates are prepared by reacting an isocyanate with an isocyanate reactive compound or with themselves to link two or more di- or polyisocyanate molecules. Such isocyanates are commercially available and include urethane-, urea-, biuret-, carbodiimide-, uretonimine-, uretdione-, allophanate-, and isocyanate-modified isocyanates. A most preferred modified isocyanate is carbodiimide-modified MDI.

The high molecular weight, high functionality polyoxypropylene diol has a molecular weight of from about 3000 Da to 10,000 Da and an actual functionality of about 1.95 or more. The high molecular weight, high functionality diols are prepared by the oxyalkylation of a difunctional initiator molecule with propylene oxide or a mixture of alkylene oxides containing about 80 weight percent or more of propylene oxide. Suitable difunctional initiator molecules include, but are not limited to, ethylene glycol, diethylene glycol, triethylene glycol, propylene glycol, dipropylene glycol, tripropylene glycol, neopentyl glycol, cyclohexane-dimethanol and the like, or oxyalkylated oligomers based on such "monomeric" initiators having equivalent weights of from about 100 Da to 500 Da. Preferably, the initiator is propylene glycol, a polyoxypropylated oligomer thereof, or an oligomer thereof prepared by oxyalkylating with a mixture of propylene oxide and ethylene oxide.

The oxyalkylation of the initiator molecule, whether a low molecular weight "monomeric" initiator or oligomeric initiator, is conducted in the presence of an oxyalkylation catalyst capable of producing the high molecular weight, high functionality, polyoxypropylene diol. Any suitable oxyalkylation catalyst may be used. For example, over the lower range of high molecular weight, for example in the range of 3000 Da to 4000 Da, catalysts such as metal porphryins, metal alkyls such as diethylzinc, calcium naphthenates as disclosed in U.S. Pat. No. 4,282,387, and barium or strontium oxides or hydroxides as disclosed in U.S. Pat. Nos. 5,010,187 and 5,114,619 may be used. In these lower molecular weight ranges, prior double metal cyanide complex catalysts such as those disclosed in U.S. Pat. No. 5,158,922 are also suitable.

However, it is preferable to employ as the oxyalkylation catalyst a double metal cyanide complex catalyst capable of oxypropylating to obtain a polyoxypropylene diol having an unsaturation of 0.008 meq/g or less, preferably 0.006 meq/g or less. Examples of such catalysts are substantially amorphous double metal cyanide complex catalysts prepared by intimate mixing of metal salt and metal cyanide salt solutions as disclosed in U.S. Pat. No. 5,470,813, preferably in the presence of a low molecular weight "organic complexing agent" such as t-butanol, and most preferably in the presence of both an organic complexing agent and a polyether polyol complexing agent. Examples of suitable oxyalkylation catalysts are presented as Examples 1–3 herein.

The oxyalkylation of the initiator molecule(s) is performed with propylene oxide or a mixture of propylene oxide and one or more additional alkylene oxides. Alkylene oxides such as 1,2- and 2,3-butylene oxide as well as other "higher" alkylene oxides are suitable. Preferably, however, the oxyalkylation is conducted only with propylene oxide or a mixture of propylene oxide and ethylene oxide such that the polyoxypropylene diol contains about 80% or more by weight oxypropylene moieties. If ethylene oxide is used in conjunction with propylene oxide, it is preferably introduced along with propylene oxide to form a random polyoxyethylene-containing polyoxypropylene diol. The oxyalkylation may be begun with propylene oxide and continued with a mixture of propylene oxide and ethylene oxide to produce block random copolymers.

The molecular weight of the polyoxypropylene diol is about 3000 Da to 10,000 Da, preferably about 4000 Da to 8000 Da. The actual functionality must be greater than 1.95, and is preferably greater than 1.97. Functionalities as close to the nominal, or theoretical functionality of two as possible are preferred. The high functionality diol may be used in conjunction with a high functionality triol, tetrol, or other high functionality polyol. By "high functionality" with respect to triols, tetrols, and the like is meant that the measured functionality is within 15 percent, and more preferably within 10 percent of the nominal, or initiator, functionality.

The isocyanate component may include minor amounts of additional di- or polyisocyanates, or additional isocyanate-terminated prepolymers other than the high molecular weight, high functionality, polyoxypropylene-diol derived prepolymers. The amount of additional isocyanates and isocyanate-derived prepolymers must be less than 30 mol percent, preferably less than 20 mol percent, and more preferably less than 10 mol percent. Most preferably, the isocyanate component consists exclusively of the 6 to 16% NCO, preferably 8–16% NCO prepolymers prepared from high molecular weight, high functionality polyoxypropylene diol as heretofore described.

The polyol component comprises in substantial part one or more diol chain extenders. By "in substantial part" relative to the polyol component is meant greater than 60 mol percent based on isocyanate-reactive components other than water. Preferably, the diol chain extender comprises 80 mol percent or more of the isocyanate reactive component of the polyol component, more preferably 85 mol percent or higher. Suitable chain extenders include but are not limited to ethylene glycol, propylene glycol, 1,3-propanediol, 1,2- and 2,3-butylene glycol, 1,4-butanediol, diethylene glycol, triethylene glycol, dipropylene glycol, tripropylene glycol, neopentyl glycol, 1,6-hexanediol, cyclohexane-dimethanol, and the like. Most preferred is 1,4-butanediol.

Low molecular weight cross-linkers having molecular weights below about 300 Da may also be included in the polyol component. Examples are glycerine, trimethylolpropane, pentaerythritol, diethanolamine, triethanolamine, and the like. The amount of low molecular weight cross-linker is preferably quite low, for example 5 weight percent or less based on the weight of all isocyanate reactive components other than water in the polyol component, preferably 2 weight percent or less. Preferably, no low molecular weight cross-linker is used.

The polyol component may optionally contain a minor mol percentage of an additional polyoxypropylene polyol, preferably a higher functionality polyoxyalkylene polyol, and/or a minor mol percentage of a polyol polymer dispersion. Suitable higher functionality polyoxyalkylene polyols are tri- to octa-functional, predominately polyoxypropylene polyols. Higher functionality polyols used in the polyol component are preferably those having a considerable quantity of primary hydroxyl groups, preferably about 30 mol percent primary hydroxyl groups or more, more preferably about 70 mol percent primary hydroxyl groups or more. Such polyols may be prepared conventionally, i.e. base-catalyzed, but preferably through double metal cyanide complex catalysis. When the latter is used and high primary hydroxyl content is desired, the double metal cyanide complex-catalyzed oxyalkylation with propylene oxide or mixture of propylene oxide and ethylene oxide may be terminated by addition of a basic metal catalyst such as sodium or potassium hydroxide which deactivates the double metal cyanide catalyst and allows for end-capping with ethylene oxide. The higher functionality polyol may have a hydroxyl number of from 20 to about 60, more preferably 25 to 40, and advantageously about 35. A nominal functionality of three is preferred. The polyol component may contain a minor proportion of a nominally difunctional polyoxyalkylene polyol, again preferably having a primary hydroxyl content similar to the higher functionality polyols described above.

The polyol polymer dispersions useful as optional minor portion of the polyol component comprise a dispersion of polymer particles in a base polyol which may be a polyoxyalkylene polyol similar to those described immediately above. The polymer particles may comprise vinyl polymer particles prepared by the in situ polymerization of one or more vinyl monomers, preferably acrylonitrile and styrene, in the base polyol, a "polymer polyol", or solids derived from the in situ reaction of one or more di- or polyisocyanates with an isocyanate reactive component such as water, hydrazine, or alkanolamine, for example a PIPA or PHD polyol, a "polymer-modified polyol." Mixtures of polymer polyols and polymer modified polyols may be used, as may also other polyol polymer dispersions such as those prepared by blending preformed polymer particles with a base polyol or by the in situ size reduction of polymers in a base polyol.

The microcellular elastomers are prepared by reacting the isocyanate component and polyol component in the presence of a blowing agent and generally in the presence of a urethane-promoting catalyst and foam stabilizing surfactant. Suitable catalysts include the commonly used metal catalysts, for example tin salts, and amine based catalysts which also promote reaction between water and isocyanate groups. Especially preferred catalysts include triethylenediamine, N,N',N",N"-tetramethyldiethylenetriamine, SA-102, an amine-type, delayed gelation catalyst available from Air Products, and UL-1, a tin mercaptide catalyst available from the Witco Chemical Co.

Suitable surfactants include the common silicone surfactants, particularly polyether silicone surfactants, such as those available from Air Products, OSi Specialties, Inc., Wacker Chemie, and Goldschmidt A.G. A preferred surfactant is Y-10788 available from OSi Specialties, Inc.

A blowing agent is a required component. The most preferred blowing agent is water, a reactive blowing agent, used in amounts effective to provide a foam density of from about 0.15 g/cm$^3$ to about 0.6 g/cm$^3$. In addition to water, non-reactive physical blowing and/or frothing agents may be used. As physical blowing agents, for example, use may be mentioned of the lower alkanes and cycloalkanes, for example butane, isobutane, pentane, cyclopentane, and the like; hydrofluorocarbons and perfluorocarbons, and other halogenated hydrocarbons. Air and other gases which are essentially inert under the reaction conditions may be employed as frothing agents, or gases such as dichlorodifluoromethane or carbon dioxide may be used as liquids under pressure. Water, or water with a minor quantity of a physical blowing or frothing agent is preferred.

Having generally described this invention, a further understanding can be obtained by reference to certain specific examples which are provided herein for purposes of illustration only and are not intended to be limiting unless otherwise specified.

EXAMPLE 1
Preparation of a Solid DMC Catalyst Containing t-Butanol and an Isobutylene Oxide-Capped 4K mol. wt. Polyoxpropylene Diol as Complexing Agents Potassium hexacyanocobaltate (8.0 g) is dissolved in deionized (DI) water (140 mL) in a beaker (Solution 1). Zinc chloride (25 g) is dissolved in DI water (40 mL) in a second beaker (Solution 2). A third beaker contains Solution 3: a mixture of DI water (200 mL), t-butanol (2 mL, organic complexing agent), and Polyol W (8 g). Polyol W is made by preparing a 4000 mol. wt. polyoxypropylene diol using double metal cyanide catalysis, and then endcapping it with from 1 to 5 equivalents per hydroxyl group of isobutylene oxide using the same DMC catalyst.

Solutions 1 and 2 are mixed together using a homogenizer. Immediately a 50/50 (by volume) mixture of t-butanol and DI water (200 mL total) is added to the zinc hexacyanocobaltate mixture, and the product is homogenized for 10 min.

Solution 3 (the polyol/water/t-butanol mixture) is added to the aqueous slurry of zinc hexacyanocobaltate, and the product is stirred magnetically for 2 min. The mixture is filtered under pressure through a 5-μm filter to isolate the solids.

The solid cake is reslurried in t-butanol (140 mL) and DI water (60 mL), and the mixture is homogenized for 10 min. A solution of DI water (200 mL) and additional Polyol W (2 g) is added, and the mixture is stirred magnetically for 2 min. and filtered as described above.

The solid cake is reslurried in t-butanol (200 mL) and is homogenized for 10 min. Polyol W (1 g) is added, and the mixture is stirred magnetically for 2 min. and filtered. The resulting solid catalyst is dried under vacuum at 50° C. (30 in. Hg.) to constant weight. The yield of dry, powdery catalyst is about 10 g.

Elemental, thermogravimetric, and mass spectral analyses of the solid catalyst show: polyol=18.0 wt. %; t-butanol=9.0 wt. %; cobalt=9.5 wt. %; zinc=20.1 wt. %.

A similar procedure is used to make additional catalysts that contain 23 and 50 wt. % of Polyol W, respectively.

EXAMPLE 2

Solution 1 is prepared by dissolving zinc chloride (75 g) in t-butanol (50 mL) and distilled water (275 mL). Solution 2 is prepared by dissolving potassium hexacyanocobaltate (7.5 g) in distilled water (100 mL). Solution 3 is prepared by mixing t-butanol (2 mL) and distilled water (200 mL).

Solution 2 is added to solution 1 over 30 minutes with homogenization. Mixing by homogenization continues for an additional 10 minutes. A stir bar is added. Solution 3 is added, and the mixture is slowly stirred magnetically for 3 minutes. The mixture is filtered under pressure at 40 psig. The filter cake is reslurried in t-butanol (130 mL) and distilled water (55 mL), and the mixture is homogenized for 10 minutes. The mixture is filtered as described before. The cake is reslurried in neat t-butanol (185 mL), and is homogenized for 10 minutes. The mixture if filtered, and the cake dried under vacuum at 60° C. Yield: 8.6 g. The catalyst is used to polymerize propylene oxide as described in Example 3. The rate of polymerization at 105° C. and 10 psig at 100 ppm catalyst is 26.3 g PO/min.

EXAMPLE 3
Polyether Polyol Synthesis: 8000 Mol. Wt. Polyoxypropylene Diol (8K-D)

A one-liter stirred reactor is charged with polyoxypropylene diol (1000 mol. wt.) starter (77 g) and a zinc hexacyanocobaltate catalyst containing 23% isobutylene oxide capped 4K diol prepared as in Example 1 (0.009 g, 10 ppm). The mixture is stirred and heated to 105° C., and is stripped under vacuum for 0.5 h to remove traces of water from the diol starter. After stripping, the reaction temperature is raised to 145° C. Propylene oxide (12 g) is fed to the reactor, initially under a vacuum of about 30 in. Hg, and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (512 g) is added gradually over about 4 h. After propylene oxide addition is complete, the mixture is held at 145° C. until a constant pressure is observed. Residual unreacted monomer is then stripped under vacuum at 60° C. from the polyol product. The product polyol has an unsaturation of 0.007 meq unsaturation/g polyol and a polydispersity of 1.15.

EXAMPLES 4 and 5 and

Comparative Example C1

A series of microcellular elastomers of 0.26 g/cm³ density were prepared from 15% NCO isocyanate-terminated prepolymers prepared by reacting excess 4,4'-MDI with 4000 Da and 8000 Da high functionality (>1.95) diols (Examples 1 and 2) and a lower molecular weight, high functionality 2000 Da diol (Comparative Example 1). The B-side of the formulation contained 28.73 parts ARCOL® E656, a conventionally base-catalyzed polyoxyethylene capped polyoxypropylene triol having a hydroxyl number of c.a. 35; 19.39 parts ARCOL® E-600, a styrene/acrylonitrile polymer polyol having a hydroxyl number of c.a. 20 and containing an oxyethylene capped polyoxypropylene triol as the base polyol; 7.47 parts 1,4-butanediol; 0.459 parts water; 0.265 parts DABCO® 33LV; 0.140 parts SA-102; 0.202 parts DABCO® BL-11; 0.007 parts UL-1 tin catalyst; and 0.82 parts Y-10788 surfactant. The isocyanate component (A-side) and B-side including polyol component, water, catalysts, and surfactant, were intensively mixed and introduced into a mold at 55–60° C. Upon demold and oven cure (25° C., 72 hours), the physical properties were measured. The results are presented in Table 1.

TABLE 1

| EXAMPLE | C1 | 4 | 5 |
|---|---|---|---|
| Prepolymer Polyol mol. wt. (Da) | 2000 | 4000 | 8000 |
| Density, g/cm³ | 0.26 | 0.26 | 0.26 |
| Hardness, Asker C | 45 | 52 | 50 |
| Tear str, 1 in (lb/in) | 6.3 | 8.8 | 10.9 |
| Comp Set,% | 39 | 11 | 12 |
| Shrinkage | 20 | 0 | 0 |

As can be seen from Table 1, the subject invention microcellular elastomers, prepared from is isocyanate-terminated prepolymers derived from high molecular weight, high functionality diols, had considerably improved properties as compared to a similar microcellular elastomer derived from a 2000 Da molecular weight diol. The hardnesses of the microcellular elastomers from the higher molecular weight diols are unexpectedly higher than that of the comparative microcellular elastomer. The tear strength is higher as well, and the compression set drastically lower, being less by some two-thirds of the compression set of the comparative elastomer. Of especial importance is the shrinkage, the subject elastomers exhibiting virtually no shrinkage.

EXAMPLES 6–8

Comparative Example C2

Elastomers were prepared at 105 index as in the preceding examples, except that the prepolymers were prepared from a 5.6:1 mixture of 4,4'-MDI and carbodiimide-modified MDI. The B-side formulation is presented below, and the physical properties in Table 2.

B-Side
29.38 parts ARCOL E656
19.83 parts ARCOL E660
7.64 parts 1,4-butanediol
0.471 H₂O
0.271 parts DABCO® 33LV
0.143 parts SA102
0.207 parts DABCO® BL-11
0.007 parts UL-1
0.84 parts Y-10788

TABLE 2

| EXAMPLE | C2 | 6 | 7 | 8 |
|---|---|---|---|---|
| Prepolymer Polyol mol. wt. (Da) | 2000 | 4000 | 6000 | 8000 |
| Resiliency | 35 | 41 | 41 | 30 |
| Compression Set, % | 39 | 22 | 14 | 16 |
| Split Tear | 7.7 | 9 | 9.2 | 10.6 |
| Hardness | 38 | 43 | 47 | 46 |

The physical properties presented in Table 2 illustrate the significant improvement in physical properties which result when high molecular weight, high functionality diol-derived prepolymers are used to prepare isocyanate-terminated prepolymer-derived elastomers.

EXAMPLES 9–12

Polyurethane microcellular elastomers were prepared from 8.5% NCO and 15% NCO isocyanate-terminated prepolymers prepared from a 4000 Da molecular weight, high functionality diol. The isocyanate-terminated prepolymers were prepared from a mixture of isocyanates containing 85% by weight pure 4,4'-MDI and 15% by weight carbodiimide-modified MDI. The B-side of the 102 index elastomers derived from the 8.5% NCO prepolymers consisted of 19.1 weight percent 1,4-butanediol, 13.2 weight percent ethylene glycol, 65.0 weight percent ARCOL® E660, balance water. For the lower density elastomer, the relative amount of water was increased by 8.5% and the amount of prepolymer increased accordingly. The B-side of the 105 index elastomers derived from the 15% NCO isocyanate-terminated prepolymers consisted of 13.35 weight percent 1,4-butanediol, 34.6 weight percent ARCOL® E660; 51.3 weight percent ARCOL® E656, balance water. For the lower density elastomer, the relative amount of water was increased by 9.3% and the amount of isocyanate-terminated prepolymer increased accordingly. Physical properties are presented in Table 3. Higher values are expected in machine trials. The results presented in Table 3 indicate that a % NCO far less than the 18% NCO industry standard produces low density elastomers with excellent physical properties. The increases in elongation and tear strength of the elastomers prepared from 8.5% NCO prepolymers are particularly noteworthy.

TABLE 3

| Example: | 9 | 10 | 11 | 12 |
|---|---|---|---|---|
| % NCO | 8.5 | 8.5 | 15 | 15 |
| Density, g/cc | 0.33 | 0.27 | 0.34 | 0.27 |
| Asker C | 58 | 43 | 63 | 51 |
| Tensile, Kg/cm² | 14.4 | 9.8 | 15.6 | 12.6 |
| % Elongation | 356 | 330 | 210 | 200 |
| Split Tear, Kg/cm | 2.9 | 1.9 | 2.1 | 1.3 |
| C Tear, Kg/cm | 9.7 | 6.8 | 9.3 | 6.0 |
| 50% Comp set, 50° C. | 20 | 28 | 10.7 | 10.7 |

EXAMPLES 13–16

A series of microcellular polyurethane elastomers according to the subject invention were prepared from 8.5% NCO prepolyers prepared from a high molecular weight (4000 Da), high functionality diol and varying quantities of a high molecular weight, high functionality triol. The prepolymers were chain extended with 1,4-butanediol containing sufficient water to prepare 0.35 g/cm³ elastomers, at an A/B ratio of 93/7. The physical properties of the elastomers are presented in Table 4. The results indicate that high performance microcellular elastomers may be produced with low molecular weight diols as chain extenders without additional polyol in the B-side. Noteworthy also are the enhanced physical properties obtained when from 25% to 50% of the polyol of the prepolymer is a high functionality, high molecular weight triol.

TABLE 4

| Example: | 13 | 14 | 15 | 16 |
|---|---|---|---|---|
| % 4000 MW diol in Prepolymer | 100 | 75 | 50 | 25 |
| % 6000 MW triol in Prepolymer | 0 | 25 | 50 | 75 |
| Asker Hard. | 58 | 59 | 60 | 62 |
| % Resiliency | 44 | 49 | 50 | 53 |
| Tensile Strength, psi | 56 | 213 | 223 | 211 |
| % Elongation | 51 | 258 | 213 | 170 |
| C Tear, lb/in | 20 | 62 | 50 | 43 |
| Comp set, % | 25 | 13 | 11 | 10 |

Having now fully described the invention, it will be apparent to one of ordinary skill in the art that many changes and modifications can be made thereto without departing from the spirit or scope of the invention as set forth herein.

What is claimed is:

1. A process for the preparation of micro-cellular polyurethane elastomers, comprising reacting:
   a) an isocyanate component comprising in substantial part one or more isocyanate-terminated prepolymers having a free NCO group content of from about 6 to about 16 weight percent, said prepolymers comprising the reaction product of a stoichiometric excess of one or more di- or polyisocyanates with a high molecular weight, high functionality polyoxypropylene diol having a number average molecular weight of about 3000 Da to about 10,000 Da and an actual functionality of about 1.95 or more;
   b) a polyol component comprising in substantial part one or more aliphatic or cycloaliphatic chain extenders or mixture thereof; in the presence of
   c) an amount of a blowing agent effective to provide a microcellular elastomer density of from about 0.15 to about 0.6 g/cm³.

2. The process of claim 1 wherein said polyol component further comprises up to about 40 mol percent of one or more isocyanate-reactive components selected from the group consisting of polyoxyalkylene polyols and polyol polymer dispersions.

3. The process of claim 2 wherein said polyoxyalkylene polyol has a hydroxyl number of from about 20 to about 60.

4. The process of claim 2 wherein said polyol polymer dispersion has a hydroxyl number of from about 15 to about 60.

5. The process of claim 1 wherein said isocyanate-terminated prepolymer derived from said high molecular weight, high functionality polyoxypropylene diol comprises about 90 mol percent or more of said isocyanate component.

6. The process of claim 1 wherein said blowing agent comprises water.

7. The process of claim 1 wherein said high molecular weight, high functionality polyoxypropylene diol contains up to about 20 weight percent oxyethylene moieties.

8. The process of claim 7 wherein said oxyethylene moieties are randomly incorporated oxyethylene moieties.

9. A microcellular low density polyurethane elastomer prepared by the process of reacting:
   a) an isocyanate component comprising in substantial part one or more isocyanate-terminated prepolymers having a free NCO group content of from about 6 to about 16 weight percent, said prepolymers comprising the reaction product of a stoichiometric excess of one or more di- or polyisocyanates with a high molecular weight, high functionality polyoxypropylene diol having a number average molecular weight of about 3000 Da to about 10,000 Da and an actual functionality of about 1.95 or more;
   b) a polyol component comprising in substantial part one or more aliphatic or cycloaliphatic chain extenders or mixture thereof; in the presence of
   c) an amount of a blowing agent effective to provide a microcellular elastomer density of from about 0.15 to about 0.6 g/cm³.

10. The microcellular low density polyurethane elastomer of claim 9 wherein said polyol component further comprises up to about 40 mol percent of one or more isocyanate-reactive components selected from the group consisting of polyoxyalkylene polyols and polyol polymer dispersions.

11. The microcellular low density polyurethane elastomer of claim 10 wherein said polyoxyalkylene polyol has a hydroxyl number of from about 20 to about 60.

12. The microcellular low density polyurethane elastomer of claim 10 wherein said polyol polymer dispersion has a hydroxyl number of from about 15 to about 60.

13. The microcellular low density polyurethane elastomer of claim 9 wherein said isocyanate-terminated prepolymer derived from said high molecular weight, high functionality polyoxypropylene diol comprises about 90 mol percent or more of said isocyanate component.

14. The microcellular low density polyurethane elastomer of claim 9 wherein said blowing agent comprises water.

15. The microcellular low density polyurethane elastomer of claim 9 wherein said high molecular weight, high functionality polyoxypropylene diol contains up to about 20 weight percent oxyethylene moieties.

16. The microcellular low density polyurethane elastomer of claim 15 wherein said oxyethylene moieties are randomly incorporated oxyethylene moieties.

17. The microcellular low density polyurethane elastomer of claim 9 wherein said polyol component consists essentially of one or more aliphatic diol or cycloaliphatic diol chain extenders having molecular weight(s) of less than about 300 Da.

18. A microcellular low density shoe midsole, prepared by introducing into a mold and reacting a mixture comprised of:
   a) an isocyanate component comprising in substantial part one or more isocyanate-terminated prepolymers having a free NCO group content of from about 8 to about 16 weight percent, said prepolymers comprising the reaction product of a stoichiometric excess of one or more di- or polyisocyanates with a high molecular weight, high functionality polyoxypropylene diol having a number average molecular weight of about 3000 Da to about 10,000 Da and an actual functionality of about 1.95 or more;

b) a polyol component comprising in substantial part one or more aliphatic or cycloaliphatic chain extenders or mixture thereof; in the presence of c) an amount of a blowing agent effective to provide a microcellular elastomer density of from about 0.15 to about 0.6 g/cm$^3$.

19. The shoe midsole of claim 17 wherein said blowing agent comprises water.

20. The shoe midsole of claim 18 wherein the density of said midsole is from about 0.20 g/cm$^3$ to about 0.35 g/cm$^3$.

* * * * *